United States Patent [19]

Nilsson et al.

[11] Patent Number: 5,721,918

[45] Date of Patent: Feb. 24, 1998

[54] METHOD AND SYSTEM FOR FAST RECOVERY OF A PRIMARY STORE DATABASE USING SELECTIVE RECOVERY BY DATA TYPE

[75] Inventors: Sven I. Nilsson, Huddinge, Sweden; Zoran Todorovic, Schliern, Switzerland

[73] Assignee: Telefonaktiebolaget LM Ericsson, Stockholm, Sweden

[21] Appl. No.: 597,342

[22] Filed: Feb. 6, 1996

[51] Int. Cl.[6] .................................................. G06F 17/30
[52] U.S. Cl. ........................................... 395/618; 395/619
[58] Field of Search ................................... 395/618, 619

[56] References Cited

U.S. PATENT DOCUMENTS

| | | | |
|---|---|---|---|
| 4,498,145 | 2/1985 | Baker et al. | 395/618 |
| 4,507,751 | 3/1985 | Gawlilck et al. | 395/618 |
| 4,648,031 | 3/1987 | Jenner | 395/182.08 |
| 4,868,744 | 9/1989 | Reinsch et al. | 395/182.17 |
| 5,043,866 | 8/1991 | Myre, Jr. et al. | 395/618 |
| 5,274,802 | 12/1993 | Altine | 395/618 |
| 5,278,982 | 1/1994 | Daniels et al. | 395/618 |
| 5,287,496 | 2/1994 | Chen et al. | 395/619 |
| 5,297,189 | 3/1994 | Chabernaud | 379/58 |
| 5,303,286 | 4/1994 | Wiedeman | 379/59 |
| 5,333,303 | 7/1994 | Mohan | 395/182.18 |
| 5,375,251 | 12/1994 | Pfundstein | 455/33.1 |
| 5,386,554 | 1/1995 | Nozaki | 395/618 |
| 5,414,840 | 5/1995 | Rengarajan et al. | 395/617 |
| 5,457,796 | 10/1995 | Thompson | 395/619 |
| 5,485,608 | 1/1996 | Lomet et al. | 395/618 |
| 5,561,795 | 10/1996 | Sarkar | 395/618 |
| 5,577,246 | 11/1996 | Priddy et al. | 395/618 |
| 5,581,750 | 12/1996 | Haderle et al. | 395/618 |
| 5,594,942 | 1/1997 | Antic et al. | 455/33.1 |

OTHER PUBLICATIONS

Proceedings of the International Conference on Data Engineering, Kobe, Japan, Apr. 8–12, 1991, Institute of Electrical and Electronics Engineers, pp. 436–443, XP000325905, Vijay et al., "Performance Measurement of Some Main Memory Database Recovery Algorithms".

*Primary Examiner*—Wayne Amsbury
*Attorney, Agent, or Firm*—Nixon & Vanderhye P.C.

[57] ABSTRACT

The present invention provides an electronic data storage and processing system where non-persistent memory such as random access memory (RAM) stores a database with a first memory section storing semi-permanent data and a second memory section storing transient types of data. A third memory section in RAM may be used to buffer database transactions relating to the semi-permanent data stored in the first memory section of RAM. At periodic and appropriate checkpoint time intervals, the semi-permanent data currently stored in the first section of RAM are copied or "dumped" onto persistent (disk) memory. Only those database transactions that affect the semi-permanent data stored in the first section of RAM occurring after the most recent checkpoint "dump" are logged onto persistent memory. Database transactions affecting the transient type of data stored in the second portion of RAM are not logged. A recovery processor recovers from a system failure by reloading semi-permanent data is from the persistent memory into the first section of RAM and executing the log. However, in one embodiment, the recovery processor may leave the data in the second section of RAM in the state in which that data exists after the system failure. Considerable time is saved by not logging transient database transactions or executing a log for those transactions when recovering from a system failure.

20 Claims, 7 Drawing Sheets

5,721,918

METHOD AND SYSTEM FOR FAST RECOVERY OF A PRIMARY STORE DATABASE USING SELECTIVE RECOVERY BY DATA TYPE

FIELD OF THE INVENTION

The present invention relates to a method and system for database recovery, and more particularly, to recovering a primary store database where at least a portion of the contents of the database fluctuate frequently over time and/or where large volumes of data have to be recovered.

BACKGROUND AND SUMMARY OF THE INVENTION

From the standpoint of an operating system, a database system carries out transactions to manage the creation, deletion, and modification of "records" stored in the database. One example of a transaction in a mobile telephony application is registering a new cell location of a "roaming" mobile radio telephone, i.e., the radio has moved from geographical cell area 1 to geographical cell area 2. More formally, a database transaction describes a specified sequence of operations that begins with what is sometimes referred to as a "begin" operation and ends with what is sometimes referred to as a "commit" operation or possibly with a "roll back" or "abort" operation. A commit operation signals successful termination of the transaction; a roll back/abort operation signals unsuccessful termination of the transaction. Accordingly, a transaction either succeeds or fails. If the transaction fails, nothing in the database should be changed.

In transaction-oriented database management systems, a recovery manager maintains the "atomic" nature of transactions and reestablishes system operation upon system failures. Failures may have their source in hardware or software. Examples of failures might include failure of the memory medium on which the database is recorded, failure of the computing system in which the database management system is operating resulting for example from a programming error, or failure of one or more transactions to successfully complete processing. Some failures, such as the loss of power, result in loss of knowledge by the system as to its own state, the state of processes under its control, and information with respect to changes/updates being made to the database.

In order to recover from failures, database management systems generally provide a checkpoint and journal/log technique. A checkpoint triggers the copying of the database contents from non-persistent media like random access memory (RAM) onto persistent media such as a magnetic disk at periodic but usually infrequent intervals of time. This periodic copying is sometimes referred to as a "dump." A mechanism is required to ensure that database transactions which occur between checkpoint "dumps" to persistent media are recorded "serially" on a journal or log. The journalled or logged data is sometimes referred to as "delta" information. The logged transactions may be stored in blocks in non-persistent storage buffers, and when the log buffers are full or at the end of relatively short time intervals, the logged transactions are written into persistent media.

While the contents of the database and log buffers in the primary, non-persistent media store may be lost during a system failure, the information stored on persistent media is usually not damaged and is used to restore most of the database information. Those database transactions in progress at the time of the failure which were not logged must be "rolled back" because they were not fully completed. In order to identify which transactions to roll back, the log/journal is searched so that at system restart time, the recovery manager can determine both the transactions that need to be "undone" to effect "roll back" and the transactions that need to be "redone" to effect "commit" in order to serially restore the database to a correct and consistent state.

In practice, the recovery manager may start with two lists: an undo list and a redo list. The undo list initially contains all logged transactions active at the time of the most recent checkpoint, and the redo list is initially empty. The recovery manager serially searches forward through the journal/log starting from the checkpoint record. If the recovery manager finds a "begin" transaction record for a given transaction, it adds that transaction to the undo list. If the manager finds a "commit" record for a given transaction, it moves that transaction from the undo list to the redo list. When the recovery manager reaches the end of the log, the undo list and the redo list identify, respectively, those transactions that must be undone and those which must be redone. Thereafter, the recovery processor goes through the log, serially redoing the transactions on the redo list and undoing the transactions on the undo list.

A significant problem with this recovery procedure is that new transactions cannot be accepted during the time that the database is being recovered. Until the recovery process is complete, many update transactions are lost. Another significant problem for systems with large amounts of data stems from the infrequent occurrence of database image dumps from non-persistent media to persistent media. Thus, the number of recovery log records that must be maintained to recover forward from a most recent image dump/checkpoint grows with time and can become quite large. The larger the log, the longer it takes to recover from a system failure.

A number of patents relate to methods for trying to obtain consistency between the checkpoints and the log including, for example U.S. Pat. Nos. 4,507,751; 4,868,744; 5,278,982; 5,043,866; 5,333,303; 5,386,554; and 5,414,840. Most of these patents do not concern themselves, however, with the size of the log or the considerable time it takes to recover from a fault. U.S. Pat. No. 5,278,982 acknowledges the need for an efficient recovery log archiving protocol but addresses this problem using a pseudo-crash recovery technique that filters and discards most undo log records during the log archiving process. But the filtering of non-essential records takes place after those non-essential records have already been logged.

It is an object of the present invention to reduce the volume of the recovery log archive and the time needed for recovery. Thus, it is an object of the present invention to provide a fast and efficient database recovery of a primary store.

The present invention establishes two different categories of data including semi-permanent data and transient data. Semi-permanent data may include data which change relatively infrequently or not at all. Semi-permanent database transactions may be handled using the conventional checkpoint and logging techniques described, for example, in the above-identified patents. Transient data are typically updated with high frequency. In addition, transient data may be of the type where some inconsistency in that data can be tolerated by the application which uses that data. Database transactions that involve transient data are not logged.

Certain kinds of database applications may be particularly well-suited to classifying data transactions into semi-permanent and transient. For example, consider a mobile telephone database application which contains a database of the location of mobile telephony subscribers. Semi-permanent database records may relate to a relatively static mobile subscriber profile, i.e., the subscriber's identification, his telephone number, services subscribed to, etc. In general, such a subscriber profile changes only infrequently or not at all. However, other more dynamic information relating to that mobile subscriber may be defined by the mobile telephony application as transient data, e.g., the subscriber's current location in the mobile telephony system. When a mobile radio subscriber changes his location, this new location is registered in the database. If such mobile subscriber location changes were logged using conventional logging mechanisms, such logging files would be extremely large. Moreover, given the considerable amount of time required to recover large logging files, it is likely that many subscribers will have already changed their location during that recovery process.

The recovery time in this kind of situation may be quite lengthy, especially where a very large log file is maintained and where the recovery process restores all locations even though only the most recently logged location is of any interest. Since no data transactions are accepted during whatever amount of time the recovery process takes, reducing that recovery time means that fewer transaction updates are lost.

The present invention provides an electronic data storage and processing system where non-persistent memory, such as random access memory (RAM), stores a database divided into first and second memory sections for storing semi-permanent types of data and transient types of data, respectively. A third memory section in RAM is used as intermediate storage, i.e., a logging buffer, for logging database transactions relating only to the semi-permanent data stored in the first memory section of RAM. A first persistent memory, such as magnetic disk, stores a copy of the semi-permanent data stored at an earlier time in the first section of RAM.

At periodic and appropriate checkpoint time intervals, the operating system copies the current data stored in the first section of RAM into the persistent disk memory. In addition, the operating system logs only those database transactions that affect the semi-permanent data stored in the first section of RAM occurring after the most recent checkpoint "dump." In other words, database transactions updating the semi-permanent data that have occurred since the most recent dump are stored in a persistent memory "log." Database transactions affecting the transient type of data stored in the second portion of RAM are not logged. Moreover, the operating system may archive only the semi-permanent data stored in the first section of RAM in the persistent disk memory. However, in an alternative embodiment, even though transient data updates are not logged, the current transient data in the second memory section may also be dumped into the persistent disk at each checkpoint. One way of classifying data as semi-permanent data or transient data is that semi-permanent data usually changes over a time period greater than the checkpoint time interval while the transient data changes more frequently, and oftentimes, during the time period between two checkpoints.

A recovery processor recovers electronic data storage and processing systems from a system failure by copying semi-permanent data from the persistent disk memory over the data currently held in the first section of RAM after the failure. In contrast, the recovery processor leaves the transient data in the second section of RAM in the state that data exists after the system failure. In an alternative embodiment where the transient data are dumped to persistent storage, the transient data in RAM are checked for consistency at reload. If the transient data in RAM are consistent, the transient data in persistent storage are not reloaded. If the transient data in RAM are not consistent, the transient data in persistent storage may be loaded into the second portion of RAM at recovery. That way the transient data are consistent even though possibly outdated.

The present invention also provides a method for managing the data handling system. Database transactions relating to semi-permanent data are stored in a first section of the non-persistent memory. Database transactions relating to transient data are stored in a second section of the non-persistent memory. At predetermined checkpoint time intervals, the data in the first section of non-persistent memory are copied into the persistent backup memory. In an alternative embodiment, the transient data may also be copied into persistent memory at checkpoint intervals and used to recover consistent (but old) transient data should the transient data stored in RAM become inconsistent. Just those database transactions affecting the semi-permanent data stored in the first section of non-persistent memory, but which occur after the most recent checkpoint "dump," are stored in a log portion of persistent memory. Database transactions that affect the transient data are not logged.

Considerable time and data processing resources are saved if only the semi-permanent of data are stored in persistent memory and only database transactions affecting the semi-permanent data are logged. With the amount of data that must be copied back into the non-persistent memory from the persistent memory and then updated using the logged database transactions being reduced because the transient data are not involved in this recovery process, the time required to recover from a system failure is considerably reduced. In addition, the shear volume of data that must be logged and archived is decreased which makes for a more efficient data handling system even in the absence of a system failure.

The foregoing, together with other features and advantages of the present invention, will become more apparent when referring to the following specification, claims, and the accompanying drawings.

BRIEF DESCRIPTION OF THE DRAWINGS

For a more complete understanding of the invention, reference is now made to the following detailed description of the embodiments illustrated in the accompanying drawings wherein like reference numerals refer to like elements throughout the drawings.

DETAILED DESCRIPTION OF PREFERRED EMBODIMENTS

In the following description, for purposes of explanation not limitation, specific details are set forth such as particular techniques and configurations to provide a thorough understanding of the present invention. However, it will be apparent to one skilled in the art that the present invention may be practiced in other embodiments that depart from such specific details. In other instances, detailed descriptions of well known methods and devices are omitted so as not to obscure the description of the present invention with unnecessary detail.

Figure 1:
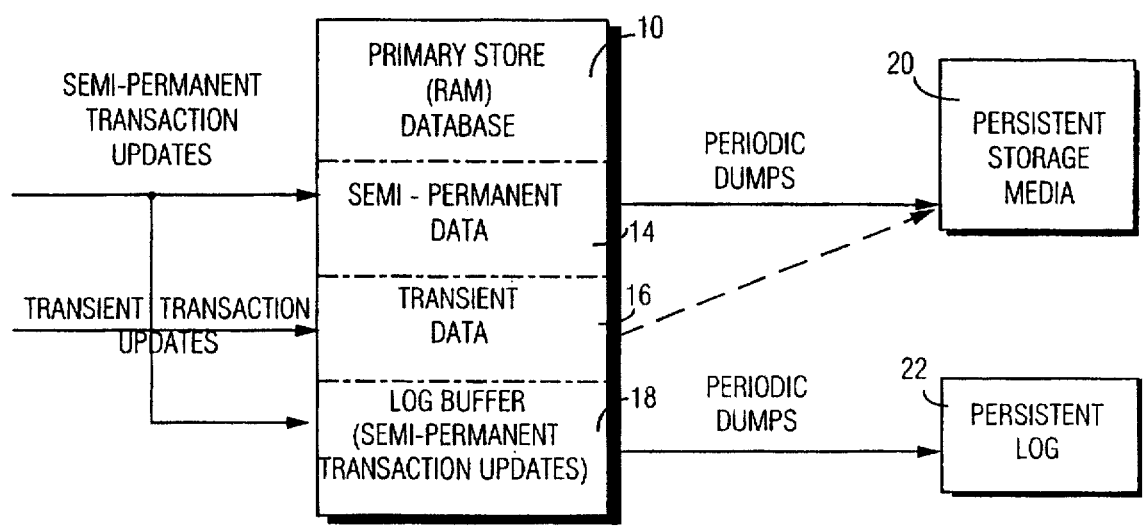
FIG. 1 illustrates a data handling and storage configuration for storing, updating, logging, and selectively archiving different types of data.

FIG. 1 shows a data storage and handling configuration for storing, updating, and selectively archiving different types of data. A "primary store" database 10 is a non-persistent memory such as random access memory (RAM) that stores a database. Data stored in non-persistent memory such as RAM is lost when power to that memory is removed even if only for a very short period of time. Primary store 10 is divided into three memory sections 14, 16, and 18. Of course, memory sections could also be separate memories if desired. The first section of memory 14 stores a first type of data such as semi-permanent data. Semi-permanent data may include data which a particular application changes relatively infrequently or not at all. The second section 16 of the primary database 10 stores a different category of data referred to as transient data. In contrast with semi-permanent data, transient data may change (but not necessarily) with higher frequency. However, semi-permanent data and transient data are used throughout this description as non-limiting examples of two categories of data which are handled differently during database updating and system failure recovery procedures. Of course, other categories of data are also encompassed by this invention. An optional but preferable third section 18 of the primary store database 10 is a log buffer for intermediate storage of database transaction updates that occur after a most recent checkpoint time interval. The log buffer 18 is employed to make the input/output transfer of transaction updates from RAM to disk more efficient.

At each checkpoint time interval, the contents of the semi-permanent data stored in the first memory section 14 are "dumped" or copied into persistent storage media 20 which may be, for example, a magnetic disk or tape. In addition, the information in the log buffer is transferred (preferably frequently) into a persistent memory log 22 which may also be magnetic disk or tape. Significantly, the transient data in the second memory section 16 are in one embodiment of the invention not dumped or copied to any persistent storage media. Instead, transient data may have been determined by an application using the database to change with sufficiently high frequency that it is not effective or efficient to dump that transient data into persistent storage because it is likely that the values of that transient data will change soon after the dump occurs. In other words, to effectively "back up" this transient data so that it could be used to restore the database in the event of a system failure, the backup/dump interval would have to be unrealistically small compared to the checkpoint dump intervals used for the semi-permanent and log buffer data.

Another significant feature shown in FIG. 1 is that although database records in all three sections of the primary store 10 are regularly updated by database transactions, only the update transactions that affect the semi-permanent data in memory section 14 are logged in log buffer 18. Transient data transactions are simply recorded in the second section of the database 16 and are not logged. In this way, the amount of data which is logged in the log buffer 18 is considerably smaller than it would be if all database transactions were logged.

In an alternative embodiment described further below, the transient data storage and RAM portion 16 may be dumped together with the semi-permanent data stored in RAM portion 14 into persistent storage media 20 at the periodic checkpoint intervals. However, in both embodiments, transient data updates are not logged. When the system recovers, the semi-permanent data are reloaded from persistent storage media 20 into semi-permanent data portion 14 of RAM. This feature may be useful for example in situations where the transient data do not change particularly fast.

Figure 2:
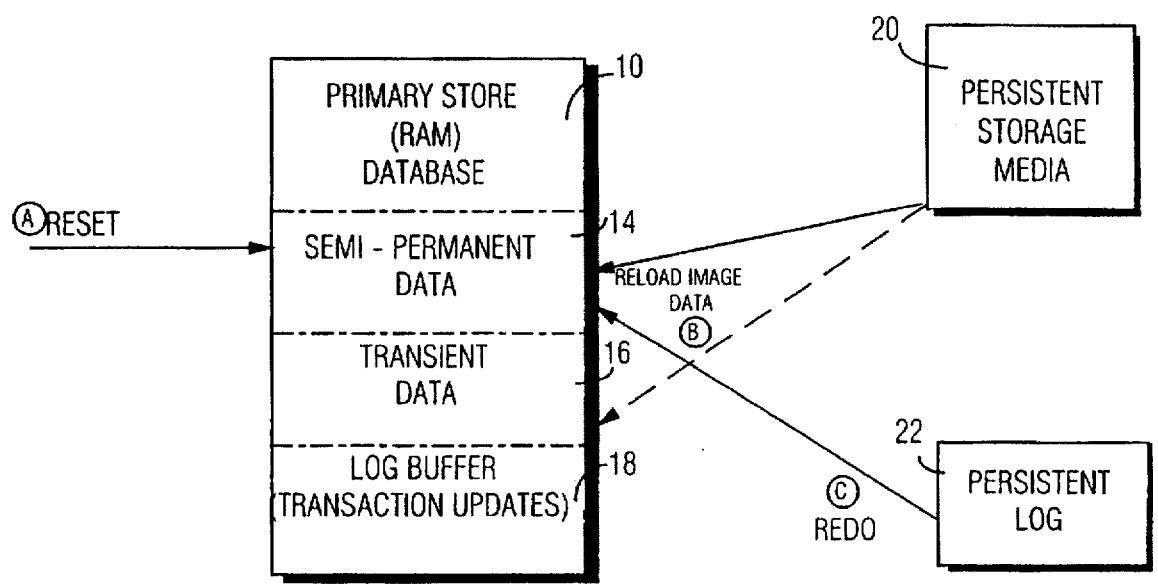
FIG. 2 illustrates a recovery process for the data handling and storage configuration shown in FIG. 1.

FIG. 2 illustrates a system failure recovery operation in accordance with the invention shown in FIG. 1. Assuming a system failure, (e.g., a software failure such as a program instruction fault, a hardware failure, or loss of power), the database recovers by preferably resetting or clearing the first memory section 14. Thereafter, the "image" copy of the semi-permanent data stored in the persistent storage media 20 at the most recent checkpoint dump is reloaded into the first section 14. Of course, the first memory section 14 need not be cleared before the reload. In this embodiment, the transient data in memory section 16 are not reset/cleared; nor is any data reloaded into memory section 16. In short, the transient data in memory section 16 are left untouched (and inconsistent in the case of a power failure). The log data from persistent log 22 are used to perform undo and redo operations necessary to recover semi-permanent data transactions in section 14 in accordance with well known procedures outlined in the background and summary section above. Although persistent storage media 20 and persistent log 22 are shown as separate memories for purposes of explanation, both can be implemented using only one persistent memory.

By not having to reload image data into the transient data second memory section 16 and/or by not having to perform the redo and undo operations for transient data based on logged transaction updates, the database recovery time in accordance with the present invention is considerably reduced. As a result, the number of unaccepted transaction updates which occurred during the recovery process are minimized. This minimal recovery time is particularly important for transient data which may be updated quite frequently, and therefore, whose most recent transactional updates are more likely to be lost during a longer database recovery.

In an alternative example embodiment mentioned above, the transient data stored in RAM portion 16 are dumped together with the semi-permanent data stored in RAM portion 14 into persistent storage media 20 at the periodic checkpoint intervals (shown as a dashed line in FIG. 1). However, transient data updates are not logged. When the system recovers, the semi-permanent data are reloaded from persistent storage media 20 into the semi-permanent data section 14 of RAM. The transient data stored in RAM portion 16 are then checked to see if they are consistent. If those transient data in RAM are determined to be inconsistent, the transient data image stored in persistent storage media 20 are reloaded into the transient data portion 16 of RAM (shown as a dashed line in FIG. 2). Thus, the restored transient data would be old but consistent.

In this alternative embodiment, an application programmer has the option to select whether he desires to have the transient data dumped and/or restored. While this embodiment may require some additional time if the transient data in RAM section 16 is determined to be inconsistent upon recovery, there is the advantage of at least having consistent (but old) transient data in the database. However, this embodiment, like the above-described embodiment, saves considerable time at system recovery by not having to perform the redo and undo operations for transient data based on logged transaction updates, i.e., by not having to execute a log for transient data updates.

Figure 3:
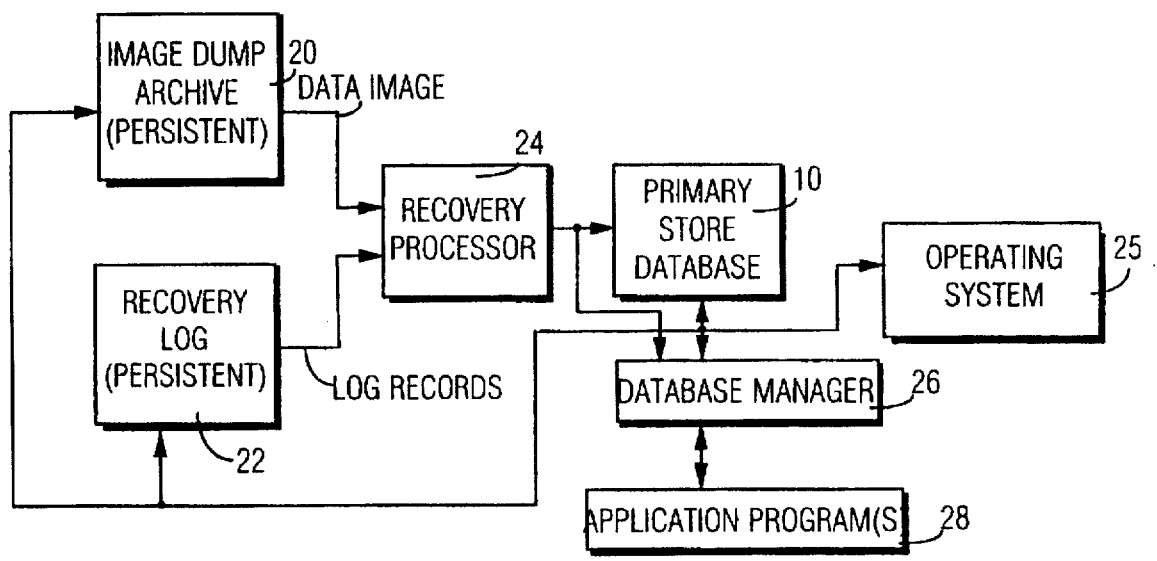
FIG. 3 is a function block diagram of a data handling and recovery system in accordance with the present invention.

FIG. 3 is a function block diagram of a database management and recovery system in accordance with the present invention. An image dump archive stores on persistent storage media 20 the last copy of the semi-permanent data in the first section 14 of the primary store 10, and optionally the last copy of the transient data in the second section 16 of the primary store 10. The recovery log 22 is also stored on persistent storage media. Both the image dump archive and recovery log are connected to recovery processor 24, operating system 25, primary store 10, and database manager 26. The database manager 26 is connected to one or more application programs 28 which utilize information in the primary store database 10 in performing their applications. The operating system 25 and database manager 26 control the transaction-oriented data handling and storage system. The recovery processor 24 performs the recovery operations outlined with respect to FIG. 2 and informs the application program via the database manager 26 of the status of the database after recovery.

The status of data in the recovered database can either be consistent but old or inconsistent. A consistent status is typically obtained when a recent backup file has been reloaded from the image dump archive 20 and recovery log 22. Alternatively, the database status may be inconsistent if the backup files are relatively old or if the system completely lost power. The consistency of the data may be determined using for example checksum error detection techniques where checksums are calculated at each dump and at reload for structure information of the database, e.g., record addresses, numbers of instances, allocated memory, etc. If the checksums match after a reload, the transient data are consistent. However, if the checksums do not match, the recovery processor 24 may inform the application that the database is inconsistent, and the application must restore the transient part of the database using information other than that currently stored in the database.

Figure 4:
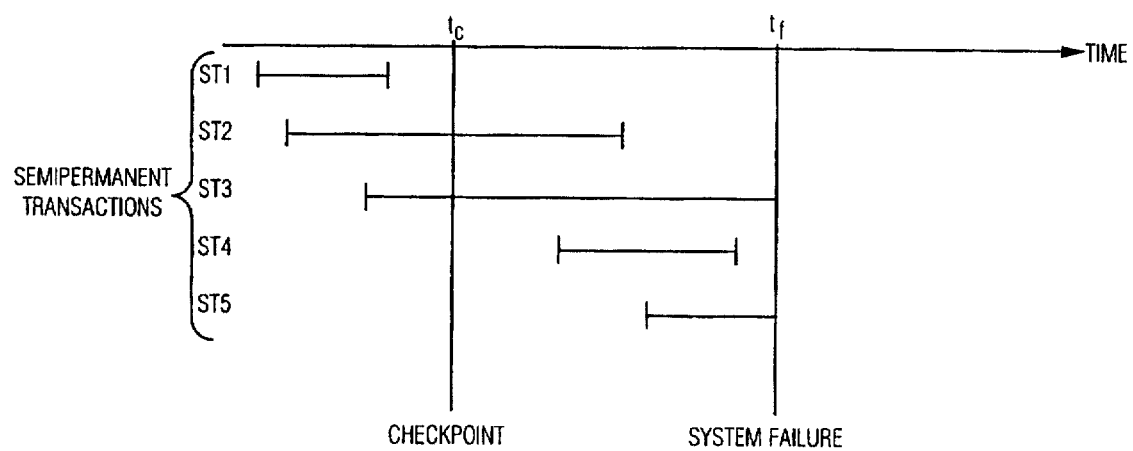
FIG. 4 illustrates different types of database transactions that may have to be dealt with at system failure.

FIG. 4 illustrates in time-line format various transaction categories which may have to be dealt with in the event of a system failure. Database transactions relating to semi-permanent data entries in the first section of memory are shown as semi-permanent transactions ST1–ST5. At time $T_c$, a checkpoint memory dump occurs. At $T_f$, a system failure occurs. Semi-permanent transaction ST1 is completed before the checkpoint $T_c$, and therefore, is readily recovered when the archive copy of the database is reloaded from persistent storage into the non-persistent database. Semi-permanent transaction ST2 started prior to checkpoint time $T_c$, completed after the checkpoint time $T_c$, but before the system failure time $T_f$. Semi-permanent transaction ST3 also started prior to the checkpoint time but did not complete before the system failure. Semi-permanent data transaction ST4 started after the checkpoint but was completed before system failure. Finally, semi-permanent data transaction ST5 also started after the checkpoint time, but was not completed by the system failure.

From the time-line drawing in FIG. 4, one may understand that uncompleted transactions ST3 and ST5 must be "undone" by the database manager 26. Transactions ST2 and ST4 must be "redone" because even though these transactions were completed before the system failure, they were not output on the most recent dump to persistent storage. Once the recovery processor 24 identifies transactions ST2–ST5, it determines which transactions must be undone and which must be redone using the undo-list and redo-list technique described in the background section above.

Figure 5:
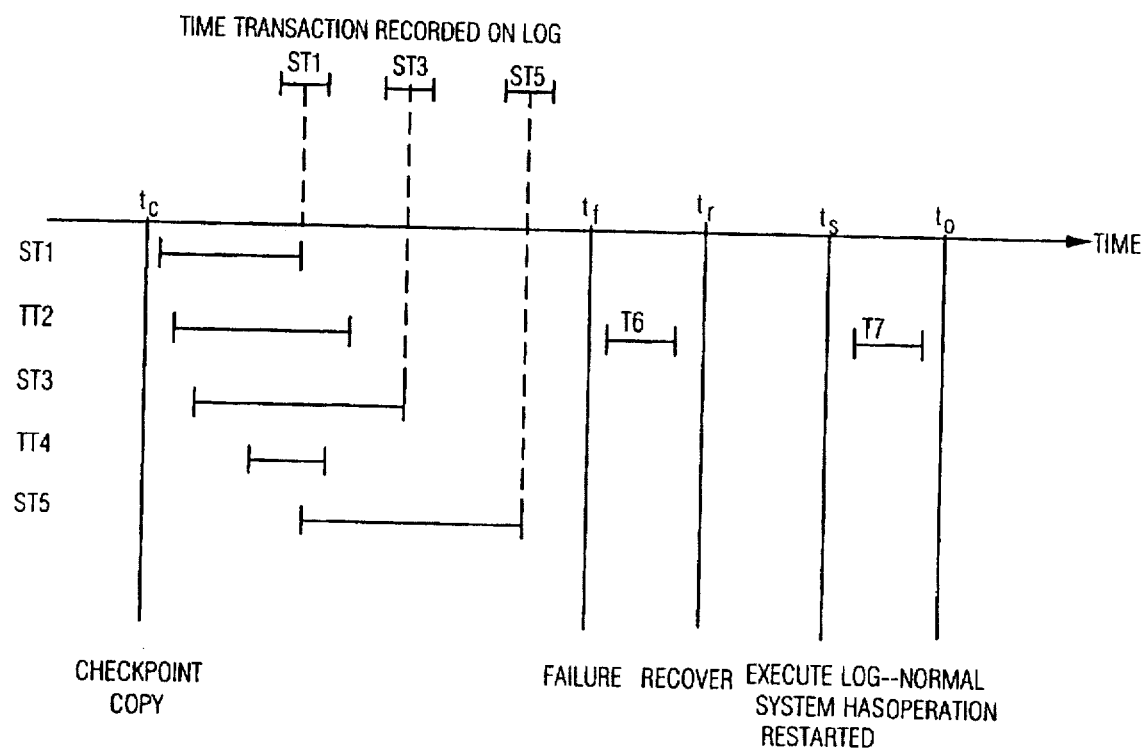
FIG. 5 illustrates a database system failure and recovery time-line.

FIG. 5 illustrates an example time line of database transactions during a system failure and recovery. At time $T_c$, a checkpoint copy is made of the semi-permanent data stored in the first memory section 14 of the primary store database 10. Various database transaction updates occur between the checkpoint time $T_c$ and the system failure time $T_f$. Only the transactions ST1, ST3, and ST5 relating to semi-permanent data are logged. Transient data transactions TT2 and TT4 are not logged.

After the system failure at failure time $T_f$, the recovery process begins and the system starts to reload. At recovery time $T_r$, the reload is completed, and the data handling and storage system begins operating again. At start time $T_s$, with the system restarted, the log is executed, and at operation time $T_o$, normal operation of the data handling and storage system is restored.

Because the database transaction T6 occurs between failure $T_f$ and start $T_s$, it is not recorded and therefore is effectively lost. As described above, the time when the system starts to accept transient data transactions is shifted from operation time $T_o$ to the earlier start time $T_s$. However, if transient data are updated after the loading the of database copy from the persistent storage archive into the first section of the database, those transient data updates, represented in FIG. 5 by transaction T7, are in fact registered in the transient data, second portion of the database. This earlier registration of new database transactions is significant. If conventional logging type recovery techniques were simply used, database transactions such as transaction T7 which occur between time $T_s$ and $T_o$ would be lost.

The present invention, by reducing the time period of database recovery relating to copying archived data from persistent memory to non-persistent database, reduces the number of lost transactions that occur during that recovery time period is reduced. In addition, database transactions which relate specifically to rapidly changing transient data may be registered before the "normal" operation of the semi-permanent data portion of the primary store database is restored, i.e., after the undoing, redoing, and log restoration procedures required for semi-permanent data. The size of log files in persistent memory (and in temporary log buffers in primary store 10) may be reduced because transient transactions are not logged.

The present invention is also advantageous in applications like intelligent networks which monitor huge amounts of data. Because this data is typically backed up at a managing site, the intelligent network may order a separate recovery orchestrated by that managing site if it detects that the data (semi-permanent and/or transient) is corrupted. Because of that external backup, it is not necessary for the database to store such large quantities of data on the periodic checkpoint dumps, irrespective of whether the data are semi-permanent or transient.

Figure 6:
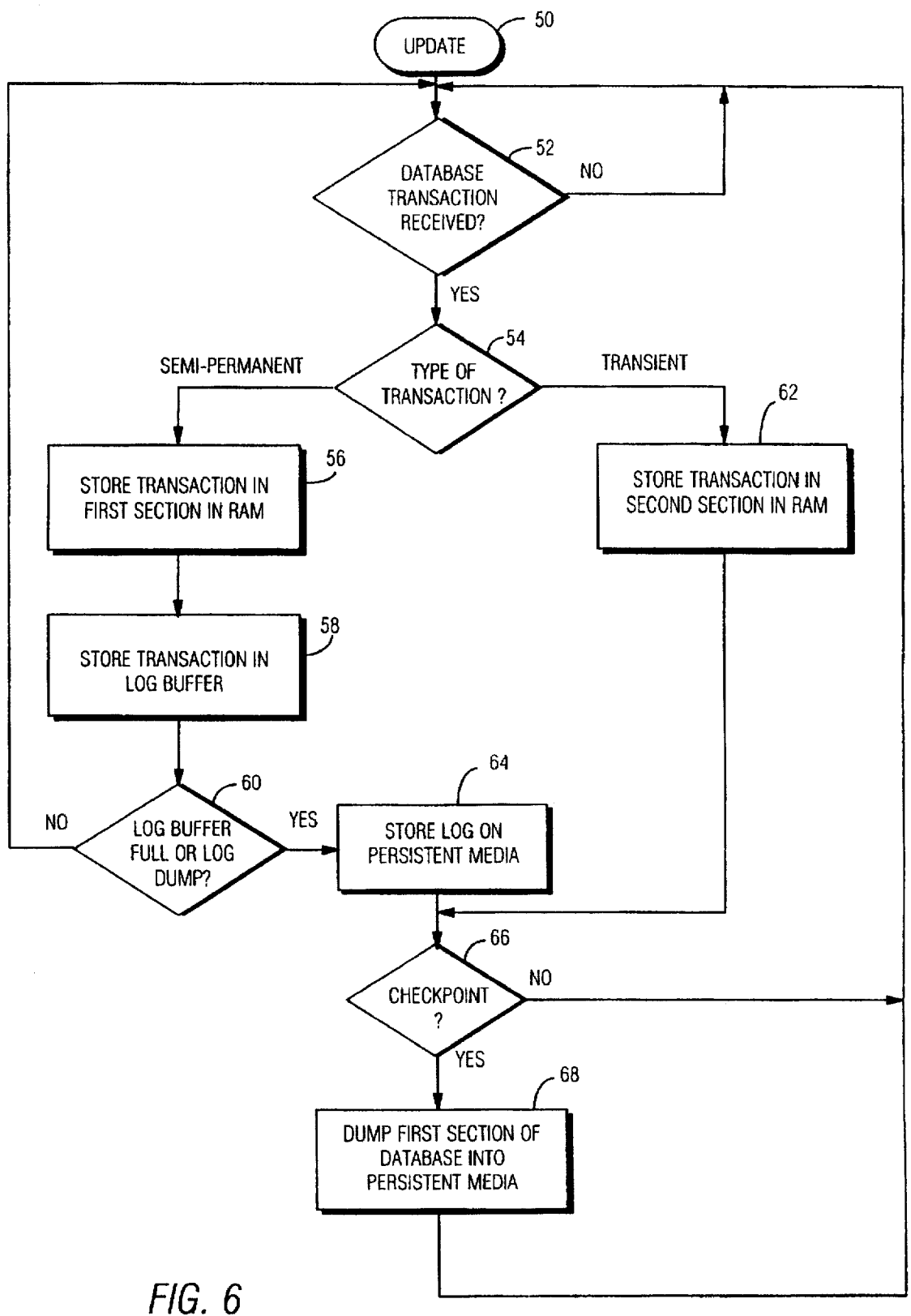
FIG. 6 is a flow chart diagram illustrating a database transaction handling procedure in accordance with the present invention.

FIG. 6 illustrates in flow chart format a routine for updating a database in accordance with the present invention. A decision is made at block 52 whether a database transaction update has just been received. If so, a second decision is made in block 54 to determine the type of the just received database transaction. If the type of transaction relates to semi-permanent data, that database transaction is stored in the log buffer section 18 of the primary store 10 (block 56). That transaction is also stored in the first database memory section 14 (block 58). A decision is made in block 60 whether the log buffer is full or if it is time to dump the log to persistent media. If not, control returns to check for receipt of another database transaction. Otherwise, the log information is stored on persistent media (block 64).

If the database transaction relates to transient data, that database transaction is stored in the second memory section 16 of primary store 10 (block 62). A decision is made after execution of blocks 62 or 64 whether it is time for a checkpoint dump (block 66), and if not, control returns to wait for receipt of the next database transaction. Otherwise, the semi-permanent data stored in first memory section 14 (and possibly the transient data in the second memory section 16 in an alterative embodiment) are dumped into persistent media (block 68).

Figure 7:
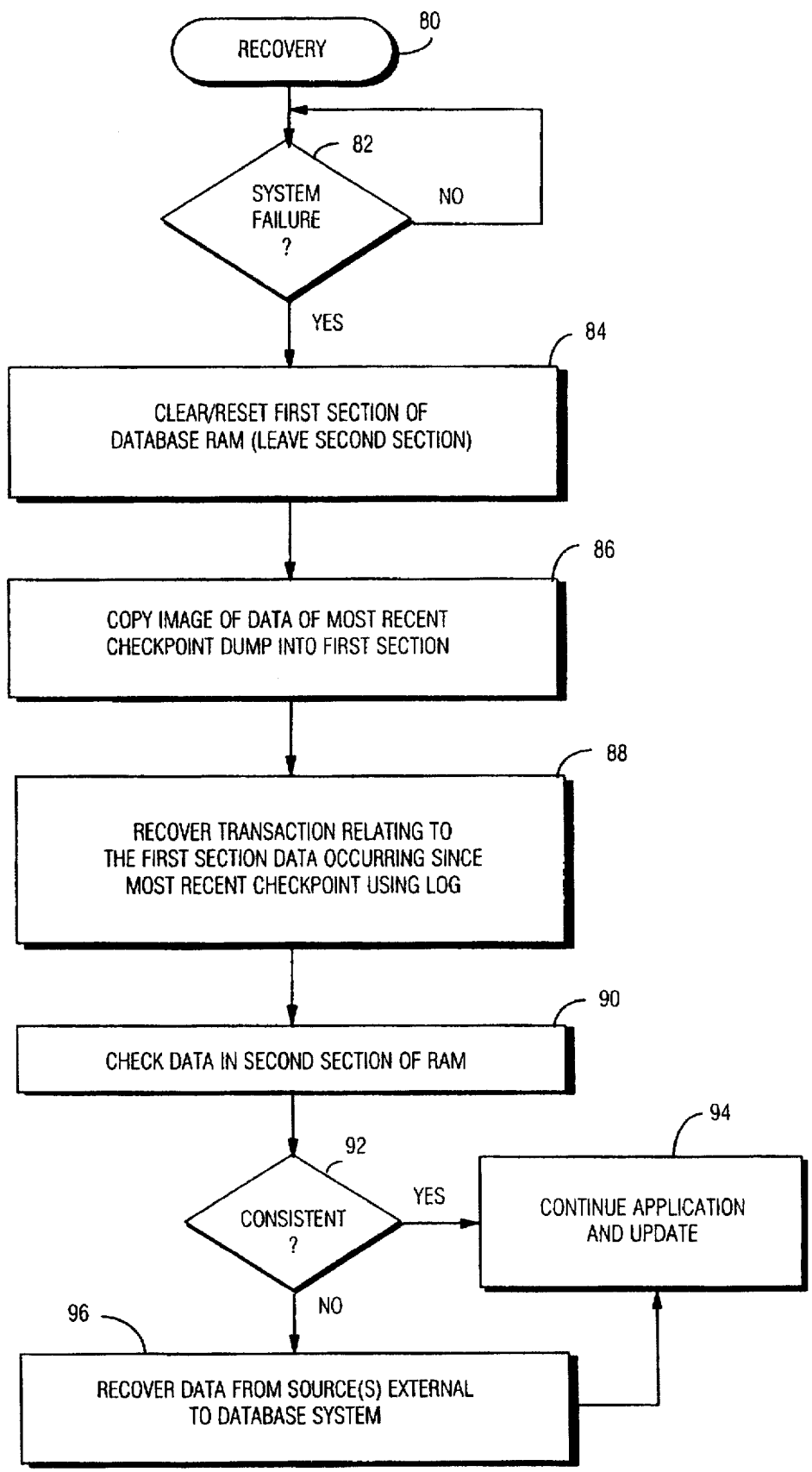
FIG. 7 is a flow chart diagram of a recovery procedure for recovering failure of a database system in accordance with the present invention.

FIG. 7 illustrates a recovery routine (block 80) which may be used to recover the database handling and storage system from system fault or failure in accordance with the present invention. A decision is made in block 82 whether a system failure has occurred. If a failure has occurred, the recovery processor optionally clears/resets the first memory section 14 of the primary store 10 (block 84). However, the second memory section 16 of the primary store 10 for storing transient type data is left untouched. The image copy of the semi-permanent data from persistent storage from the most recent checkpoint dump is copied into the first memory section 14 (block 86). The recovery processor further recovers database transactions relating to semi-permanent data which have occurred since the most recent checkpoint using the log information from persistent log 22 (block 88). The recovery processor checks the transient data in the second section 16 of the primary store 10 (block 90). A decision is made in block 92 whether that data is consistent. If it is, the application continues, and further updates to that data are received (block 94). Otherwise, the data are inconsistent, and must be recovered from sources other than the database system (block 96) or in the alterative embodiment, an image copy of transient data from persistent storage from the most recent checkpoint dump is copied into the second memory section 16).

One particular application of the present invention is to mobile telephony systems that manage a large database of mobile subscribers. The mobile telephony application designates certain database records according to type, e.g., as semi-permanent or transient. In general, a mobile subscriber profile, including the subscriber's identification, his telephone number, additional telephony services to which that particular subscriber subscribes, etc., changes infrequently or not at all. In contrast, a roaming mobile telephone (i.e., a subscriber travelling in an automobile between various cellular telephone "cells") may register a new cell location very frequently. Data relating to a subscriber's current location may be declared by the mobile telephony application as transient data. Thus, when a mobile subscriber changes his location, his new location is simply registered in the transient section of the database but not logged. If such mobile subscriber location changes were logged using conventional logging techniques, the logging files would be huge. Moreover, the amount of time required to recover such large logging files after a system failure would be quite extended with potentially many database transaction updates occurring during that extended recovery process being lost. Those mobiles whose transaction updates are not recorded during extended recovery are then "lost" from the perspective of the subscriber database.

The mobile telephony application in accordance with the present invention recognizes that this mobile location type data is suitable for designation as transient type data because it changes very frequently. Alternatively and/or additionally, data which can be tolerated by the application as inconsistent data may also be appropriately designated as transient. Since the transient data are not dumped or logged, they are assumed to be consistent—a good assumption in certain types of system failures. Otherwise or in addition, the application must handle the inconsistency of that transient data.

In the case of changing mobile telephone locations, mobile subscribers frequently and automatically send in registration messages to the mobile telephony application which may be used by the application to restore current database values or correct data values for inconsistent transient data. Alternatively, the mobile telephony application could broadcast a localization order to all mobile subscribers requiring them to report in their current location which would then be used to restore the database. Another alternative would be to use application files external to the database. Such application files (which may be quite large) can be stored in memory independent of the database system. In this situation, such large amounts of data (which may or may not change rapidly), may be defined as transient because the application has an easy mechanism by which to restore the database in the event a system failure renders that transient data inconsistent, such as the intelligent network example described above. This is another example of how the amount of data which has to be archived and logged by the database system may be reduced using the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electronic data storage and processing system, comprising:

nonpersistent memory for storing a database including first and second sections corresponding to first and second types of data;

first persistent memory for storing a copy of data currently stored in the first section;

second persistent memory for logging database transactions; and a data processor copying the first type of data stored in the first section into the first persistent memory at checkpoint time periods and logging in the second persistent memory only those database transactions relating to the first type of data stored in the first section that occur after a most recent checkpoint, wherein transactions relating to the second type of data stored in the second portion are not logged.

2. The system in claim 1, wherein the data processor stores only data from the first section in the first persistent memory at each checkpoint.

3. The system in claim 1, wherein the data processor stores data from both the first and second sections in the first persistent memory at each checkpoint.

4. The system in claim 1, wherein the first type of data are semi-permanent data that usually change over a time period greater than the checkpoint time periods and the second type of data are transient data that change more frequently than the first type of data.

5. An electronic data storage and processing system, comprising:

nonpersistent memory for storing a database including first and second sections corresponding to first and second types of data;

first persistent memory for storing a copy of the first type of data stored in the first memory section;

a system manager copying data stored in the first section into the first persistent memory at checkpoint time periods; and a recovery processor for recovering from a system failure by copying the first type of data from the first persistent memory into the first section of the nonpersistent memory, wherein the recovery processor leaves the data in the second section of the nonpersistent memory in the state that data exists after the failure.

6. The system in claim 5, wherein the database manager determines the consistency of the second type of data stored in the second section, and if the second type of data stored in the second section is inconsistent, an application program using the second type of data in the database recovers consistent data for storage in the second section.

7. The system in claim 5, wherein the first persistent memory stores a copy of the second type of data stored in the second memory section and the database manager determines the consistency of the second type of data stored in the second section, and wherein if the data in the second memory section is inconsistent, the database manager copies the second type of data stored in the first persistent memory into the second section of nonpersistent memory.

8. The system in claim 5, wherein the non-persistent memory includes a third section for buffering recent database transactions relating to data in the first section and the database manager stores in the third section only those transactions relating to the first type of data stored in the first section that occur after a most recent checkpoint, with transactions relating to the second type of data stored in the second section not being buffered in the third section.

9. The system in claim 8, further comprising:

a second persistent memory for logging the buffered transactions, wherein the recovery processor recovers only the first type of data for the first section from the system failure using the logged transactions stored in the second persistent memory.

10. The system in claim 5, further comprising:

second persistent memory for logging only those transactions relating to the first type of data that occur after a most recent checkpoint, with transactions relating to the second type of data not being logged in the second persistent memory.

11. The system in claim 5, wherein the first type of data are semi-permanent data that usually changes only over a time period greater than the checkpoint time interval and the second type of data are transient data that changes more frequently than the first type of data.

12. A method for managing a data handling system that includes nonpersistent memory for storing a database and persistent memory, comprising the steps of:

storing database transactions relating to a first type of data in a first section of the non-persistent memory;

storing database transactions relating to a second type of data in a second section of the non-persistent memory;

copying the first type of data in the first section at predetermined checkpoint time intervals into the persistent memory;

storing in the persistent memory only those database transactions affecting the first type of data stored in the first section that occur after a recent checkpoint time interval, wherein database transactions affecting the second type of data stored in the second section are not stored in the persistent memory.

13. The method in claim 12, wherein only the first type of data in the first section of the non-persistent memory are stored in the persistent memory at each checkpoint.

14. The method in claim 12, wherein data in both the first and second sections of the non-persistent memory are stored in the persistent memory at each checkpoint.

15. The method in claim 12, wherein the first type of data are semi-permanent data that usually change only over a time period greater than the checkpoint time intervals and the second type of data are transient data that change more frequently than the first type of data.

16. A method for recovering an electronic data storage and processing system from a system failure, comprising the steps of:

storing in nonpersistent memory a database having first and second sections corresponding to first and second types of data;

transferring the first type of data stored in the first section into a first persistent memory at checkpoint time periods; and recovering from a system failure by loading the first type of data from the first persistent memory into the first section of the database after the failure and leaving the second type of data in the second section of the database in a state that second type of data exists after the failure.

17. The method in claim 16, farther comprising:

logging only database transactions relating to the first type of data in the first section, and storing in a third section of the database only transactions relating to the first type of data stored in the first section that occur after a recent checkpoint and not storing in the third section transactions relating to the second type of data stored in the second section.

18. The method in claim 17, further comprising:

transferring from the third section into the persistent memory only transactions relating to the first type of data stored in the first section that occur after a most recent checkpoint.

19. The method in claim 18, further comprising:

recovering only the first type of data for the first section from the system failure using the transactions stored in the persistent memory.

20. The method in claim 16, wherein the first type of data are semi-permanent data that usually change only over a time period greater than the checkpoint time intervals and the second type of data are transient data that change more frequently than the first type of data.

* * * * *